US008521089B2

(12) United States Patent
Lin et al.

(10) Patent No.: US 8,521,089 B2
(45) Date of Patent: Aug. 27, 2013

(54) REDUCING CO-CHANNEL INTERFERENCE

(75) Inventors: Xintian Eddie Lin, Mountain View, CA (US); Qinghua Li, Sunnyvale, CA (US); Ozgur Oyman, Palo Alto, CA (US); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1480 days.

(21) Appl. No.: 12/080,082

(22) Filed: Mar. 31, 2008

(65) Prior Publication Data
US 2009/0247086 A1 Oct. 1, 2009

(51) Int. Cl.
*H04B 1/00* (2006.01)

(52) U.S. Cl.
USPC ........ 455/63.1; 455/446; 455/67.11; 455/450; 455/447; 455/443; 370/328; 370/335; 370/336; 370/241; 370/337; 370/311; 370/341; 370/235; 370/320; 370/441; 375/130; 379/59

(58) Field of Classification Search
USPC .......... 455/446, 63.1, 67.11, 450, 447, 552.1, 455/562.1, 422.1, 443, 114.2, 452.1, 13.3, 455/501, 34.1, 38.3, 54.1; 370/328, 335, 370/336, 241, 337, 311, 341, 235, 320, 441, 370/501, 342, 345, 442; 375/130, 202; 379/59
See application file for complete search history.

(56) References Cited

U.S. PATENT DOCUMENTS

| 5,551,057 | A * | 8/1996 | Mitra .............................. 455/522 |
| 5,566,363 | A * | 10/1996 | Senda ............................ 455/126 |
| 5,838,673 | A * | 11/1998 | Ritz et al. ...................... 370/336 |
| 5,966,377 | A * | 10/1999 | Murai ............................ 370/342 |
| 6,047,186 | A * | 4/2000 | Yu et al. ......................... 455/446 |
| 6,301,238 | B1 * | 10/2001 | Hagerman et al. ............ 370/336 |
| 6,366,779 | B1 * | 4/2002 | Bender et al. ................. 455/450 |
| 6,498,934 | B1 * | 12/2002 | Muller ........................... 455/450 |
| 6,529,494 | B1 * | 3/2003 | Ostman et al. ................ 370/337 |
| 6,748,222 | B1 * | 6/2004 | Hashem et al. ............... 455/453 |
| 7,016,649 | B1 * | 3/2006 | Narasimhan et al. ........ 455/63.1 |
| 7,206,564 | B2 * | 4/2007 | Yang et al. .................... 455/307 |
| 7,236,746 | B2 * | 6/2007 | Peric ........................... 455/67.11 |
| 7,453,861 | B2 * | 11/2008 | Leung et al. .................. 370/342 |
| 7,688,777 | B2 * | 3/2010 | Liberti et al. ................. 370/328 |
| 2002/0052204 | A1 * | 5/2002 | Bender et al. ................. 455/450 |
| 2004/0022207 | A1 * | 2/2004 | Leung et al. .................. 370/321 |

(Continued)

OTHER PUBLICATIONS

Metz et al., "Methods for Fabricating PMOS Metal Gate Structures", U.S. Appl. No. 11/968,099, filed Dec. 31, 2007.
Etemad et al., "Techniques to Enhance Location Estimation in a OFDMA Based System", U.S. Appl. No. 11/736,0680, filed Apr. 18, 2007.

*Primary Examiner* — April G Gonzales
(74) *Attorney, Agent, or Firm* — Trop, Pruner & Hu, P.C.

(57) ABSTRACT

A base station may transmit at varied power levels. Subscriber stations receiving the power levels can transmit noise information back to the base station. As a result, co-channel interference can be determined from the varied power transmissions, either in the base station or in the subscriber station. In addition, in some embodiments, the transmissions may include different phases so that the phase of the co-channel interference may be determined as well.

24 Claims, 4 Drawing Sheets

(56) References Cited

U.S. PATENT DOCUMENTS

| | | | |
|---|---|---|---|
| 2004/0190471 A1* | 9/2004 | Bender et al. | 370/329 |
| 2004/0266383 A1* | 12/2004 | Mattellini et al. | 455/307 |
| 2005/0085237 A1* | 4/2005 | Yang et al. | 455/452.2 |
| 2005/0128985 A1* | 6/2005 | Liberti et al. | 370/335 |
| 2005/0180351 A1* | 8/2005 | Peric | 370/328 |
| 2007/0161361 A1* | 7/2007 | Vaisanen et al. | 455/302 |
| 2007/0184806 A1* | 8/2007 | Yang et al. | 455/307 |
| 2008/0159362 A1* | 7/2008 | Gelbman et al. | 375/219 |

* cited by examiner

REDUCING CO-CHANNEL INTERFERENCE

BACKGROUND

This relates generally to wireless communications.

The capacity of current cellular telephone systems is limited by co-channel interference. In the downlink, co-channel interference is due to transmissions from the base stations in neighboring cells. The strongest co-channel interference is experienced by the subscriber station near the cell edges. Thus, referring to FIG. 1, the subscriber station A is close to an edge of the cell C of base station BS1 and may receive co-channel interference from base station BS2, for example.

Multiple base station transmit cooperation (MBSC) and single base station transmit nulling (SBSN) can be exploited to reduce co-channel interference with significant gain. Both schemes involve an estimate of the channel quality between each base station and subscriber station. However, estimating the signal to interference plus noise ratio (SINR) for a weak neighboring base station may be difficult. The preambles from multiple base stations are superimposed and the preamble detection rate from a weak base station is low. In addition, feedback of SINRs for all base stations is multiplied by the number of base stations and may be prohibitive due to the cumbersome overhead. Information exchange among the local subscriber stations has been proposed to reduce feedback, but it requires additional resources allocated for the local exchange.

DETAILED DESCRIPTION

Figure 1:
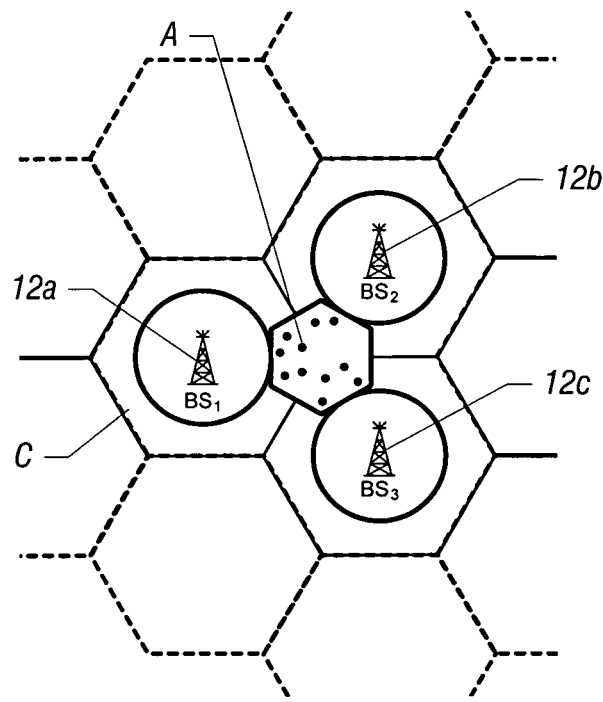
FIG. 1 is a schematic depiction of a wireless network in accordance with one embodiment.

In accordance with some embodiments, the major interfering base stations (e.g. BS1, BS2, BS3, in FIG. 1) for each subscriber station may be identified without increasing feedback. The subscriber station feedback may be unchanged in some embodiments. Namely, each subscriber station may still only feedback the signal to interference plus noise ratio (SINR) of the desired and/or associated base station.

Figure 2:
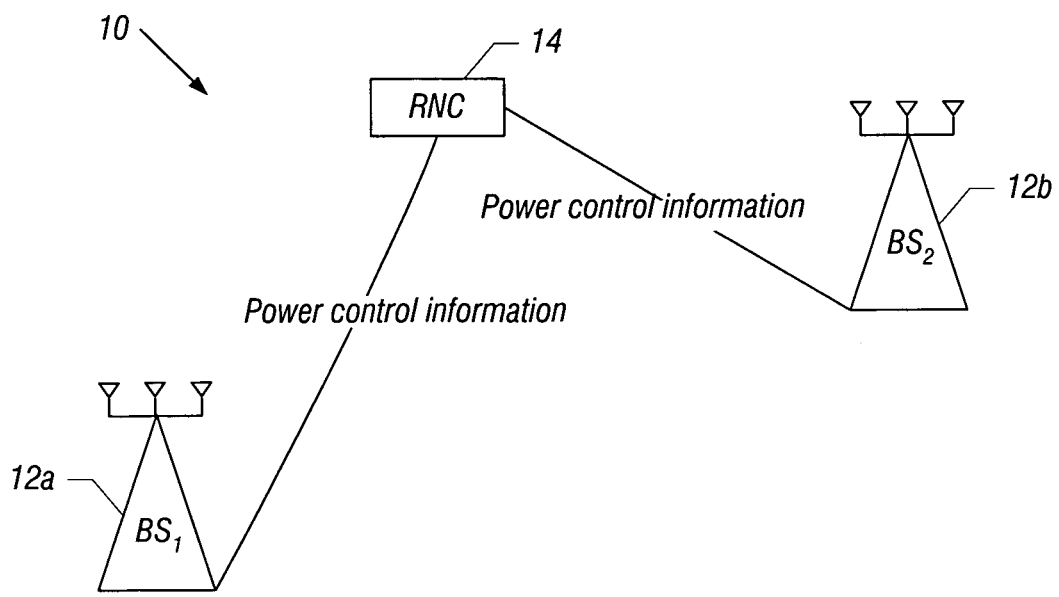
FIG. 2 is a schematic depiction in accordance with one embodiment of the present invention.

However, each base station may transmit signals of different frequencies and power levels over a series of time intervals. The base stations may exchange the transmission power levels through wired backbone networks, which connect the base stations, such as the base stations BS1 12a and BS2 12b, to the radio network controller (RNC) 14, as shown in FIG. 2. The channel gain and interference level can then be computed in each base station using the legacy SINR feedback and the various power levels at different frequencies.

More particularly, the difference between what the base station sent and the signals received by the subscriber stations (represented by the SINRs) can be compared to solve the equations for the co-channel interference. Since the transmission power is the same for the whole subscriber station data zone C in FIG. 1, the exchange of transmission power levels consumes very little overhead in the wired network.

Further, the transmission power level exchange may be removed in some embodiments, while still enabling subscriber stations to identify interfering base stations. A set of subcarriers, such as common pilots, may be used to carry a time variant power loading pattern. The power loading patterns are known to all base stations and subscriber stations from the transmission of different power levels identified by a cell identifier, such as the sector ID specific to a particular base station. Either or both of the base station and subscriber station can exploit the predetermined power loading pattern to compute the co-channel interference level.

In one embodiment, each of the base stations provides communication services to subscriber or mobile stations. This service involves the exchange of wireless signals. Such signals may, for example, be modulated according to orthogonal frequency division multiplexing (OFDM) and/or orthogonal frequency division multiple access (OFDMA) techniques. Accordingly, the base stations and subscriber stations may operate in IEEE 802.16 Worldwide Inoperability for Microwave Access (WiMAX) System or a WiMAX II system. The embodiments, however, are not limited to such modulation techniques or systems.

The SINR fed by the k-th subscriber station at t-th frame with the n-th base station being the desired base station is expressed as:

$$\gamma_{nk}(t) = \frac{\|h_{nk}\|^2 P_n(t)}{\sum_{i \neq n}^{N} \|h_{ik}\|^2 P_i(t) + \sigma_0^2} \quad (1)$$

where the index i represents the co-channel interfering base stations; N is the total number of base stations in the neighborhood; $P_i(t)$ is the transmit signal power of the i-th base station on a sub-band; and $\sigma_0^2$ represents the thermal noise power at each subscriber station. The effective channel from base station n to subscriber station k for the sub-band is denoted by $h_{nk}$, where the effect of the detector (e.g. Minimum Mean Squared Error (MMSE) receiver) is included; and the terms $\|h_{ik}\|^2$ in the denominator determines the co-channel interference.

Each subscriber station is associated with one base station and sends back the SINR to the base station periodically over time. In addition to $\|h_{nk}\|^2$, base station n needs to know $\|h_{ik}\|^2$ for $i \neq n$ so that multi-base station cooperation can be enabled and the strongest interferer/worst victims can be identified for single base station transmit nulling. Let $g_{ik} = \|h_{ik}\|^2$ and rewrite (1) as:

$$\gamma_{nk}(t) \left[ \sum_{i \neq n}^{N} g_{ik} P_i(t) + \sigma_0^2 \right] = g_{nk} P_n(t), \quad (2)$$

and in matrix format $$[\gamma_{nk}(t) P_1(t) \ \ldots \ -P_n(t) \ \ldots \ \gamma_{nk}(t) P_N(t)] \begin{bmatrix} g_{1k} \\ \vdots \\ g_{nk} \\ \vdots \\ g_{Nk} \end{bmatrix} = -\gamma_{nk}(t) \sigma_0^2. \quad (3)$$

A key observation from (3) is that the transmit power levels $P_i(t)$, i=1, ... N are known to the base station from the wired backbone and the channel attenuation $g_{ik}$, i=1, ... N are the unknowns. The channel coherence time of the interfering links is assumed to be long enough so that the channel values $g_{ik}$ remain fixed over the duration of M frames. This assumption can be relaxed (to the $g_{ik}$ being correlated) to identify only the strongest interfering base stations instead of estimating $g_{ik}$ with high accuracy. The fixed-channel assumption may be used for description simplicity. Using the feedbacks over M frames with M≧N, identify $g_{ik}$ by solving the linear equation:

$$\begin{bmatrix} \gamma_{nk}(1)P_1(1) & \ldots & -P_n(1) & \ldots & \gamma_{nk}(1)P_N(1) \\ \vdots & & \vdots & & \vdots \\ \gamma_{nk}(M)P_1(M) & \ldots & -P_n(M) & \ldots & \gamma_{nk}(M)P_N(M) \end{bmatrix} \begin{bmatrix} g_{1k} \\ \vdots \\ g_{nk} \\ \vdots \\ g_{Nk} \end{bmatrix} = -\sigma_0^2 \begin{bmatrix} \gamma_{nk}(1) \\ \vdots \\ \gamma_{nk}(M) \end{bmatrix}. \quad (4)$$

The transmit power $P_i(t)$ varies over time because the base station performs transmit power control to serve near and far subscriber stations. Since the power control is independent between base stations, the first matrix on the left hand side of (4) is invertible with probability one and the solutions of channel attenuations can be obtained. In practice, since the identifying the strongest two interferers leads to most of the gain, N=M=3 is sufficient. Letting M be greater than N makes (4) overdetermined and pseudo inversion is applied.

Since there is error in the SINR computation, a model including the error is:

$$\gamma_{nk}(t) = \frac{g_{nk} P_n(t)}{\sum_{i \neq n}^{N} g_{ik} P_i(t) + \sigma_0^2} + v_{nk}(t) \quad (5)$$

where $V_{nk}(t)$ is the error at time t and it is independent across time. Then, (4) can be written as:

$$\begin{bmatrix} \gamma_{nk}(1)P_1(1) & \ldots & -P_n(1) & \ldots & \gamma_{nk}(1)P_N(1) \\ \vdots & & \vdots & & \vdots \\ \gamma_{nk}(M)P_1(M) & \ldots & -P_n(M) & \ldots & \gamma_{nk}(M)P_N(M) \end{bmatrix} \begin{bmatrix} g_{1k} \\ \vdots \\ g_{nk} \\ \vdots \\ g_{Nk} \end{bmatrix} + \eta = -\sigma_0^2 \begin{bmatrix} \gamma_{nk}(1) \\ \vdots \\ \gamma_{nk}(M) \end{bmatrix}, \quad (6)$$

where η is the error vector due to SINR error. The covariance matrix of η is a function of $g_{ik}$ and $P_i(t)$. The matrix can be approximated by the estimates of $g_{ik}$, which are obtained by ignoring the SINR error. Once the covariance matrix is computed, the minimum mean squared error (MMSE) solution of (6) can be computed. Increasing M can improve the estimation accuracy of $g_{ik}$. However, since the channel may vary over M frames and the interference power level does not need to be estimated with high accuracy for the multi-base-station cooperation, a small M is desirable in some embodiments. For lots of cases, identifying the strongest interfering base stations is sufficient, which have the greatest values for $g_{ik}$, provided that the sum of the remaining interference terms can be accurately approximated as Gaussian noise and the resultant noise power can be correctly estimated and incorporated into the $\sigma_0^2$ term.

The derivation above is for localized resource allocation such as band adaptive modulation and coding (AMC) mode. It can be extended to distributed allocation such as Partial Usage of Subchannels (PUSC) mode. The derivation above still applies. The $g_{ik}$ is now the average channel gain across multiple subcarriers. For example, the channel gain is redefined as:

$$g_{ik} = \frac{1}{L} \sum_{l=1}^{L} \|h_{ik}^{(l)}\|^2 \quad (7)$$

where L is the number of subcarriers; $h_{ik}^{(1)}$ is the effective channel gain for the l-th subcarrier. The function of summation can be replaced by other functions e.g.

$$g_{ik} = \exp\left(\frac{1}{L} \sum_{l=1}^{L} \log\|h_{ik}^{(l)}\|^2\right)$$

depending on the coding scheme. Equations (1)-(6) still hold.

If the base station can overhear the neighboring base stations for $P_i(t)$ (i.e. power control message), the information exchange over the wired network is not needed.

This methodology may be expanded to have multiple antennas at base stations, as well as subscriber stations. The strongest interfering base station can be identified in a similar way. In a relay assisted cellular network, the interfering channel from relay stations can also be estimated by this methodology, provided that the transmit power of the relay station is known by the base station controlling it.

The scheme prefers that the first left matrix in equations 4 or 6 above be invertible. This implies that the transmit power level of each SINR estimation block varies over time. The SINR computation in each subscriber station may be conducted for a short time window, such as four orthogonal frequency division multiplexing (OFDM) symbols. Otherwise, if the $P_i(t)$ is a quantity averaged over a frame, the variation of $P_i(t)$ is small and the small variation affects the inversion and, thus, the estimation accuracy. Therefore, in some embodiments, industry standards may specify the time and/or frequency window for the SINR feedback.

Because the same frequency time resource block in a series of frames may be assigned the same subscriber station and the power control for a given subscriber station varies slowly over time, the SINR measurement may be conducted for different resource blocks. For example, the subscriber station may measure the SINRs of the first and second OFDM symbols for the first and second frames, respectively.

In one embodiment, the exchange of power control information among base stations may be removed. This may be done by varying the pilot power. If the transmit power is known, then there is no need to exchange the power control information. A set of subcarriers in frequency and time may be reserved in all base stations' transmissions. There is a unique known power loading pattern on the carriers for each base station. The reserved subcarriers are some of the common pilots. The power loading pattern varies from frame to frame for each base station. The pattern may be determined by the cell identifier or sector ID. The subscriber station estimates the SINR using the power varying pilots and normal common pilots. The full rank condition of the power loading matrix in equations 4 and 6 can then be guaranteed by optimizing the power load patterns.

Figure 3:
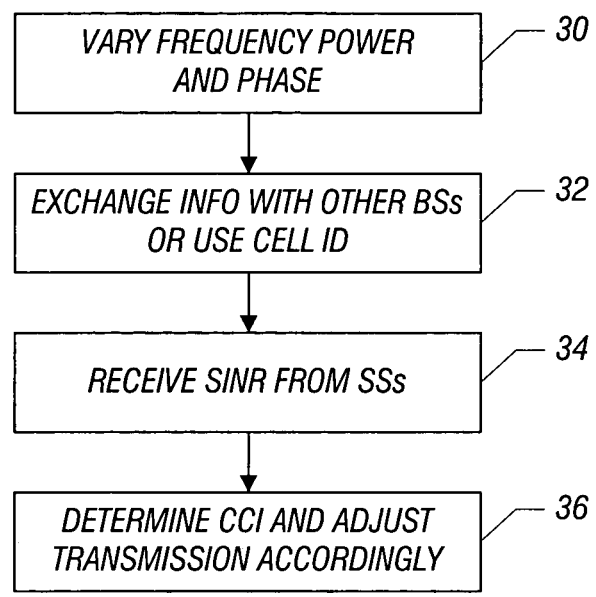
FIG. 3 is a flow chart for one embodiment.
Figure 4:
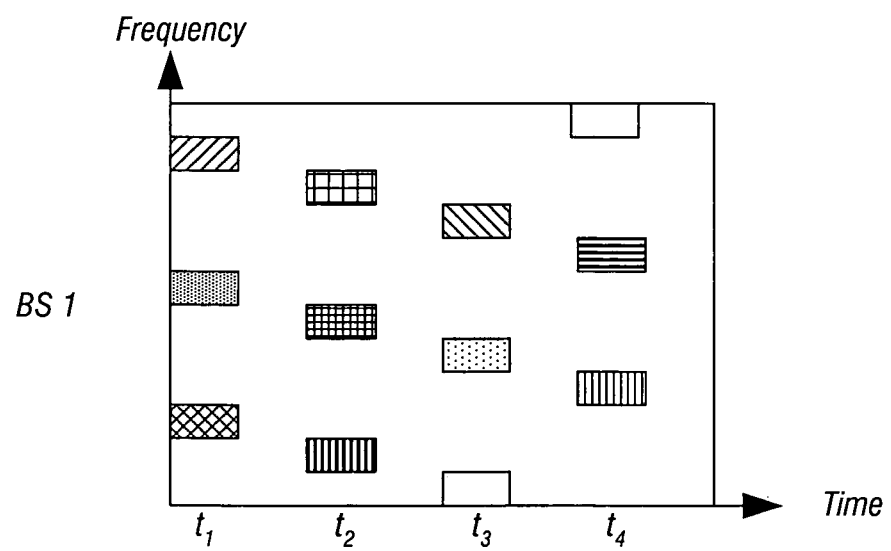
FIG. 4 is a graph of frequency versus time to show power loading patterns on common pilots according to one embodiment.

Referring to FIG. 4, a sequence may, for example, be implemented in source code in a base station. The base station may vary frequency, power level, and, in some cases, phase transmitted to a subscriber station, as indicated in FIG. 3, block 30. Optionally, as indicated in block 32, the information on power level and phase variations may be conveyed over a wired backbone to other base stations. Alternatively, a cell ID may be used so that proximate base stations can extract this information from the transmissions themselves.

After receiving feedback in the form of SINR signals from subscriber stations (block 34), the base stations (or subscriber stations) can determine co-channel interference. Subsequent transmissions may be modified to accommodate for the interference (block 36).

Thus, referring to FIG. 4, different power levels, indicated by the rectangular blocks, may be used for each base station. At each time interval $t_1$, $t_2$, $t_3$, and $t_4$, a set of three different power levels, at three different frequencies, is transmitted. More or less frequencies, power levels, and time intervals may be used in some embodiments. The reserved subcarriers fully overlap in frequency and time across the cells. Since both the base stations and the subscriber stations know the transmit powers on the reserved subcarriers, which are computed from the cell ID, both of them can solve equations 4 and 6 without any exchange of power control information. Therefore, the exchange on the backbone wire network is unneeded in some embodiments.

Since the pilot power varies, the subscriber station may scale the computed SINR according to the varied pilot power level before feeding channel quality indicator (CQI) back to the legacy support. The base station can reverse the scaling. Since the subscriber station can also identify the strongest interfering base stations, the subscriber station can send a message to the base station for common channel interference mitigation.

Since the phase information is lost in the SINR feedback, the feedback scheme outlined above does not enable the base station to compute the full complex channel information. With the additional phase information, the transmit nulling can be performed at each base station to reduce the co-channel interference.

Figure 5:
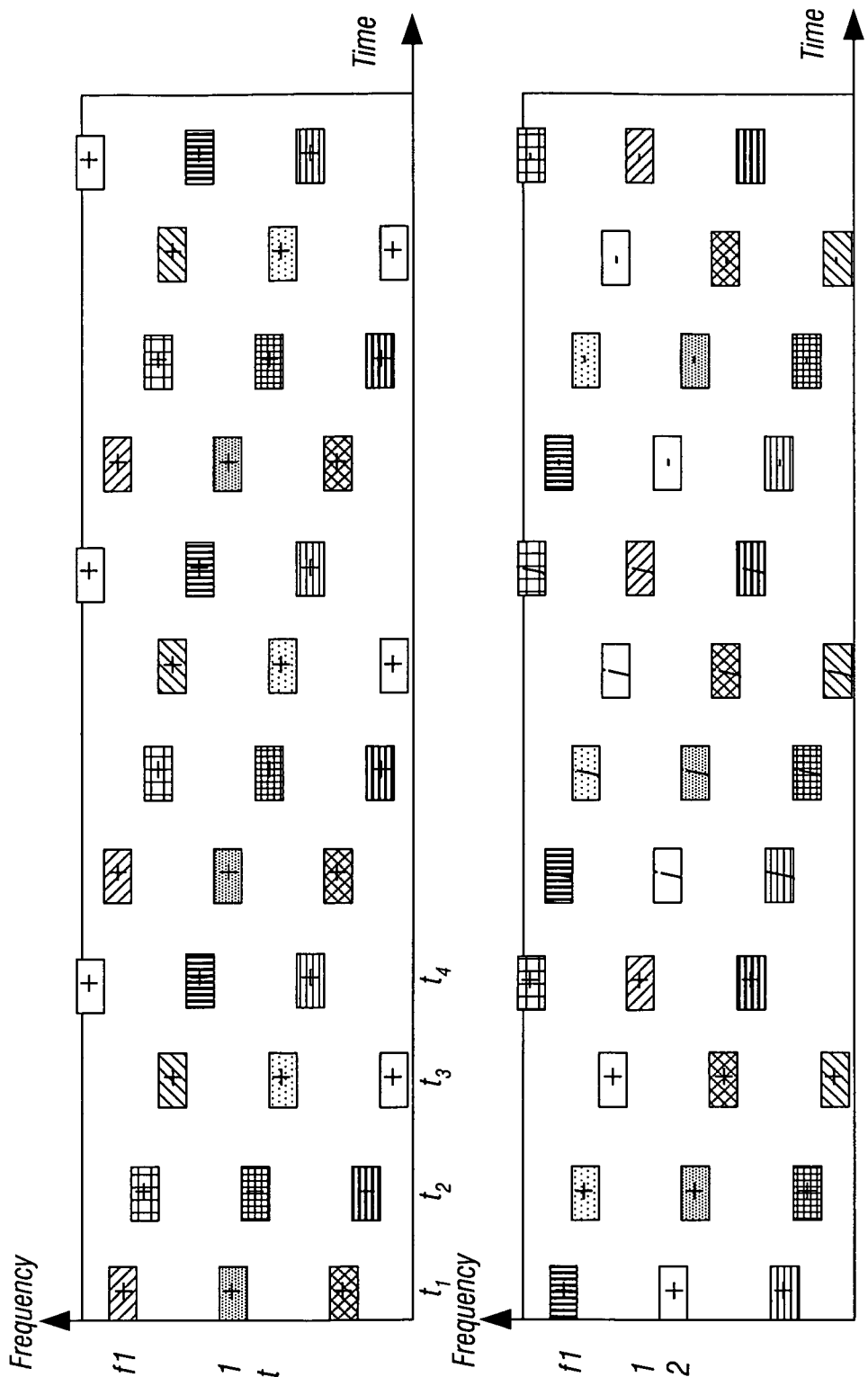
FIGS. 5A and 5B are graphs of frequency versus time to show multi-antenna pilot power and phase loading in accordance with one embodiment.

One scheme to estimate the phase of the channel is as follows. Referring to FIGS. 5A and 5B, the phase information may be estimated for multiple antennas of a base station. Since only the relative phases between the antennas of base stations are important, the common phase of the antennas of one base station may be ignored. Without loss of generality, assume two antennas in a base station and a single antenna on a subscriber station. The pilot power loading is the same as that in FIG. 4. A phase loading is added to the pilot, the (+), (j), and (−) represent a 0, 90, and a 180 degree phase, respectively. For example, by receiving three consecutive SINR feedbacks on frequency F1, equations 4 and 6 can be solved and the base station has the following information:

$$g_{1,k}(1) = \|h_{1,1k} + h_{1,2k}\|^2$$

$$g_{1,k}(2) = \|h_{1,1k} + jh_{1,2k}\|^2$$

$$g_{1,k}(3) = \|h_{1,1k} - h_{1,2k}\|^2$$

Where $h_{n,lk}$ represents the channel between base station n, antenna 1 and subscriber station k. Since the over all (common) phase of the channel vector $[h_{1,1k}, h_{1,2k}]$ is redundant, there are only three real value unknowns. The feedback is sufficient to solve for them. The scheme can be extended to N transmit antennas at the base station by having 2N−1 different phase loading.

In some embodiments, the legacy SINR is fed back from each subscriber station. It may not be necessary to calculate the channels to each base station.

A base station BS1, BS2, or BS3 may be implemented according to FIG. 2. The embodiments, however, are not limited to this implementation.

Figure 6:
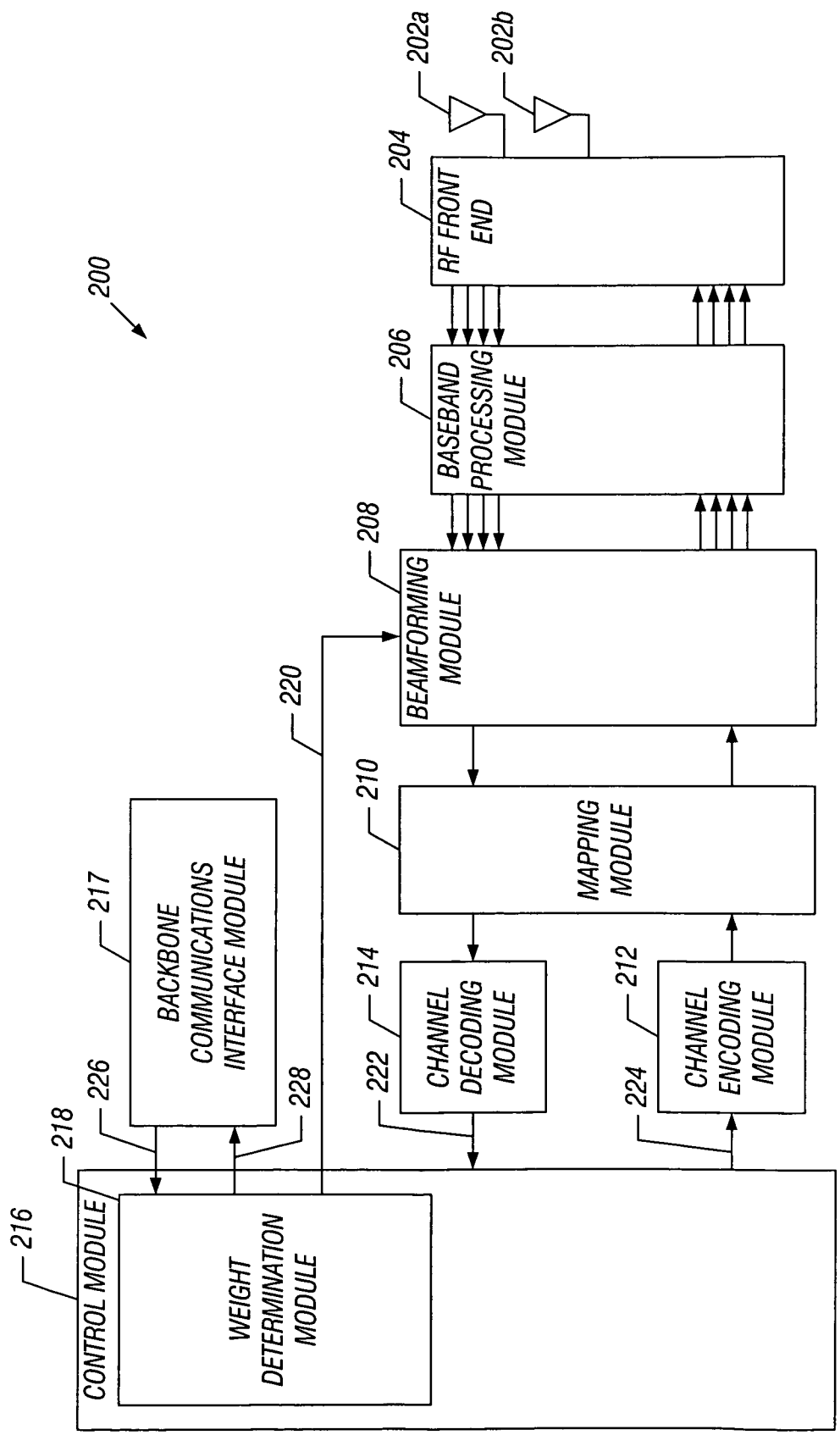
FIG. 6 is a schematic diagram of an exemplary base station in accordance with one embodiment.

Base station 200, shown in FIG. 6, may include various elements including antennas 202a-d, a radio frequency (RF) front end 204, a baseband processing module 206, a beamforming module 208, a mapping module 210, a channel encoding module 212, a channel decoding module 214, a control module 216, and a backbone communications interface module 217. These elements may be implemented in hardware, software, firmware, or any combination thereof.

For purposes of illustration (and not limitation), FIG. 6 shows base station 200 including two antennas (202a-b). The embodiments, however, are not limited to this number. In fact, any number of antennas may be employed. Through antennas 202a-b, base station 200 may communicate with one or more mobile stations. Such communications may employ the beamforming techniques described herein.

RF front end 204 exchanges signals between antennas 202a-b and baseband processing module 206. In particular, RF front end 204 prepares modulated signals received from baseband processing module 206 for wireless transmission, and prepares received RF signals for processing (e.g., demodulation) by baseband processing module 206. RF front end 204 may include various components (e.g., electronics) such as amplifiers, filters, upconverters, downconverters, diplexers, and/or circulators. However, the embodiments are not limited to these examples.

Baseband processing module 206 receives weighted signals from beamforming module 208 and modulates these signals. For instance, baseband processing module 208 may receive a weighted signal for each of antennas 202a-b. Upon receipt of these signals, baseband processing module 206 performs modulation operations to generate modulated signals corresponding to each of antennas 202a-b. In addition, baseband processing module 206 may convert these modulated signals from digital signals into analog signals and send them to RF front end 204.

Further, baseband processing module 206 receives multiple analog signals from RF front end 204. Each of these signals corresponds to one of antennas 202a-d. Upon receipt of these signals, baseband processing module 206 converts these signals to digital signals and demodulates them.

In embodiments, the modulation and demodulation operations performed by baseband processing module 206 may be in accordance with OFDM or OFDMA techniques. Thus, modulation operations may involve Inverse Fast Fourier Transforms (IFFTs), while demodulation operations may involve Fast Fourier Transforms (FFTs).

In one embodiment, baseband processing module 206 implements the variation of power levels and phase for purposes of determining co-channel interference. In this regard, a series of power levels and frequencies can be transmitted at different time intervals. Also, different phase information can be sent as well. The control of such transmission may be by software, in some embodiments, but hardware or firmware may also be used. These transmissions may be correlated with identification of the cell using a cell ID, for example. The cell ID may also indicate whether power levels are varied and where phase is varied.

Beamforming module 208 may apply a set of weights to signals that are for transmission by base station 200. For instance, beamforming module 208 may apply a set of weights to a signal received from mapping module 210. As a result, beamforming module 208 produces a weighted signal for each of antennas 202a-b. These weighted signals are sent to baseband processing module 206 for processing, as described above.

FIG. 6 shows that the weights applied by beamforming module 208 are received (as weights 220) from control module 216. For OFDM/OFDMA type systems, these weights comprise a set of weights for each of antennas 202a-b. Each set of weights includes a weight for each subcarrier used at the corresponding antenna. These weights may each be a complex value (i.e., having a magnitude and a phase).

Accordingly, for each set of weights, each subcarrier value for a signal received from mapping module 210 is multiplied by the corresponding subcarrier weight. This results in a weighted signal for each of antennas 202a-b. As described above, these weighted signals are sent to baseband processing module 206. Thus, in embodiments, beamforming is performed in the frequency domain. However, equivalent time domain operations (which correspond to such frequency domain beamforming operations) may be employed as well. Thus, embodiments may employ beamforming in the frequency domain and/or the time domain.

Further, embodiments may perform receive beamforming with nulling. This may involve multiplying signals received from baseband processing module 206 (i.e., a signal for each of antennas 202a-d) by their corresponding weights. As described above, this may involve multiplying subcarrier values with corresponding subcarrier weights. The results of the multiplications for each set of weights may be combined (e.g., summed) to produce a combined signal that is sent to mapping module 210 for further processing.

Mapping module 210 receives bits from channel encoding module 212 and maps them to particular subcarriers. This produces a mapped signal (e.g., a mapped quadrature amplitude modulation (QAM) signal or a mapped phase shift keying (PSK) signal), which is sent to beamforming module 208 for processing, as described herein.

In addition to conveying information received from channel encoding module 212, the signal generated by mapping module 210 may also include beamforming pilots. These beamforming pilots are employed by mobile stations to assess wireless channel characteristics. As described herein, beamforming pilots may comprise predetermined values for one or more predetermined subcarriers. These subcarriers may be distributed over frequency as well as over time.

Further, mapping module 210 receives a combined signal from beamforming module 208 and converts the combined signal to soft bits or symbols. These soft bits or symbols are sent to channel decoding module 214.

Channel encoding module 212 receives an information sequence 224 (e.g., payload data and/or control information) from control module 216. In turn, channel encoding module 212 performs various operations on this sequence. Such operations include randomizing, forward error correction (FEC) encoding, and/or interleaving operations. In turn, channel encoding module 212 provides an encoded signal to mapping module 210 for processing, as described herein.

Channel decoding module 214 may receive soft symbols or bits from mapping module 210. Upon receipt, channel decoding module 214 may perform operations, such as deinterleaving, FEC decoding, and/or de-randomization. Upon performance of such operations, channel decoding module 214 produces a received information sequence 222.

FIG. 6 shows that received information sequence 222 is sent to control module 216. Received information sequence 222 may include data and control information. Such control information may include channel quality indicator (CQI) messages generated by mobile stations.

Backbone communications interface module 217 provides for the exchange of information with other base stations. For instance, backbone communications interface module 217 may send and receive information regarding characteristics of interfering downlink channels, as described herein. This exchange of information among base stations may occur across wired or wireless networks. Moreover, base stations may exchange such information through various network and/or system entities.

Accordingly, backbone communications interface module 217 may include elements, such as network interface cards, electronics, and/or other elements to provide such communications capabilities. These elements may be implemented in hardware, software, firmware, or any combination thereof FIG. 6 shows that control module 216 is coupled to channel encoding module 212 and channel decoding module 214. Thus, control module 216 may send and receive information that is exchanged with mobile stations. Accordingly, control module 216 may include components and/or functionality to operate according to one or more protocol layers. Such protocol layers may provide features, such as packet encapsulation/decapsulation, error correction encoding/decoding, signaling, link protocols, and/or media access protocols. However, control module 216 may include other components and/or functionality. In turn, control module 216 may exchange information (e.g., payload data) with higher level protocols and/or application entities (not shown).

FIG. 6 shows that control module 216 includes a weight determination module 218. During operation, control module 216 receives channel quality indicator (CQI) messages from demodulation module 214 and provides them to weight determination module 218. Such CQI messages are sent by mobile stations served by base station 200.

FIG. 6 further shows that control module 216 is coupled to backbone communications interface module 217. As described above, backbone communications interface module 217 may receive downlink interfering channel characteristics. Such characteristics are reported by mobile stations served by other base stations. As shown in FIG. 6, this information is sent (as interfering channel characteristics 226) to weight determination module 218.

Weight determination module 218 determines beamforming weights (e.g., weights 220) for the mobile stations serviced by base station 200. In embodiments, these mobile stations are cell edge stations. These determinations are based on characteristics of various wireless channels.

As described above, the elements of base station 200 may be implemented in hardware, software, firmware, or any combination thereof. Thus, implementations may include one or more processors that execute instructions or control logic stored in a storage medium (e.g., memory). These instructions or control logic may provide features of one or more of the elements of base station 200. The embodiments, however, are not limited to such implementations.

Such storage media may be implemented in various ways. For example, such storage media may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   using varied transmission power levels and signal to interference and noise ratio information to develop a measure of co-channel interference.

2. The method of claim 1 including exchanging varied transmission power levels between multiple base stations.

3. The method of claim 2 including exchanging transmission power levels over a wired backbone.

4. The method of claim 1 including determining the varied transmission levels from the signals themselves and a cell identifier.

5. The method of claim 1 including determining said measure in a subscriber station.

6. The method of claim 1 including identifying a strongest interfering base station.

7. The method of claim 1 including determining co-channel interference in a base station.

8. The method of claim 1 including varying phase and power levels to determine co-channel interference.

9. The method of claim 1 including using subcarriers to carry a time variant power loading pattern.

10. The method of claim 9 including reserving a set of subcarriers in frequency and time for a base station transmission.

11. The method of claim 10 including reserving subcarriers that are common pilots.

12. The method of claim 1 including transmitting signals with different phases to determine the phase component of co-channel interference.

13. The method of claim 12 including using two antennas to vary the phase of transmissions from a base station to determine co-channel interference.

14. An apparatus comprising:
   a radio frequency front end; and
   a module coupled to said front end, said module to transmit at varied power levels to develop a measure of co-channel interference.

15. The apparatus of claim 14 wherein said module to extract a cell identifier from transmissions from other base stations in order to determine co-channel interference.

16. The apparatus of claim 14 wherein said module to determine co-channel interference using noise information in the form of signal to interference plus noise ratio from subscriber stations.

17. The apparatus of claim 14 wherein said module to identify only the two strongest interfering base stations.

18. The apparatus of claim 14 wherein said apparatus is a base station.

19. The apparatus of claim 14 wherein said apparatus to vary both the phase and power levels to determine co-channel interference.

20. The apparatus of claim 14 wherein said module to generate subcarriers to carry a time variant power loading pattern.

21. The apparatus of claim 20 wherein said module to reserve a set of subcarriers in frequency in time for transmission from a base station.

22. The apparatus of claim 21 wherein said module to reserve subcarriers that are common pilots.

23. The apparatus of claim 14 wherein said module is a base band processing module.

24. The apparatus of claim 14 including a processor coupled to said front end and an antenna coupled to said processor.

* * * * *